(12) United States Patent
Hufton et al.

(10) Patent No.: US 6,312,658 B1
(45) Date of Patent: *Nov. 6, 2001

(54) INTEGRATED STEAM METHANE REFORMING PROCESS FOR PRODUCING CARBON MONOXIDE AND HYDROGEN

(75) Inventors: Jeffrey Raymond Hufton, Fogelsville; Shivaji Sircar, Wescosville; William Frederick Baade, Breinigsville; Joseph Michael Abrardo, Schnecksville; Madhu Anand, Allentown, all of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/624,149

(22) Filed: Apr. 8, 1996

Related U.S. Application Data

(63) Continuation-in-part of application No. 08/419,317, filed on Apr. 10, 1995.

(51) Int. Cl.[7] .................................................. C01B 31/18

(52) U.S. Cl. .......................................... 423/418.2; 423/654
(58) Field of Search ............................... 95/97; 423/418.2, 423/437 M, 651, 652, 653, 654, 655, 656, 659

(56) References Cited

U.S. PATENT DOCUMENTS

| | | | | |
|---|---|---|---|---|
| 4,491,573 | * | 1/1985 | Stonner et al. | 423/656 |
| 5,256,172 | * | 10/1993 | Keefer | 423/230 |
| 5,449,696 | * | 9/1995 | Dandekar et al. | 518/706 |

* cited by examiner

*Primary Examiner*—Stuart L. Hendrickson
(74) *Attorney, Agent, or Firm*—Keith D. Gourley

(57) ABSTRACT

The present invention is a process for producing an essentially pure carbon monoxide (CO) product and an essentially pure hydrogen product by reforming a hydrocarbon such as methane and steam in the presence of a reforming catalyst to produce a reformate product enriched in CO, carbon dioxide and hydrogen. The reformate is subjected to an integrated series of separation steps and carbon dioxide present in a portion of the waste effluent recovered from such series of spearation steps is shifted to CO in an integrated sorption enhanced reaction (SER) process.

9 Claims, 9 Drawing Sheets

INTEGRATED STEAM METHANE REFORMING PROCESS FOR PRODUCING CARBON MONOXIDE AND HYDROGEN

CROSS-REFERENCE TO RELATED APPLICATIONS

This application is a continuation-in-part to copending U.S. patent application Ser. No. 08/419,317, filed Apr. 10, 1995, the Specification and claims which are incorporated by reference and made a part of this application.

TECHNICAL FIELD OF THE INVENTION

The present invention is a process for producing an essentially pure carbon monoxide (CO) product and an essentially pure hydrogen product by reforming a hydrocarbon and steam in the presence of a reforming catalyst to produce a reformate product enriched in CO, carbon dioxide and hydrogen. The reformate is subjected to an integrated series of separation steps and carbon dioxide and hydrogen present in the waste effluent recovered from such series of separation steps is shifted to CO in an integrated sorption enhanced reaction (SER) process.

BACKGROUND OF THE INVENTION

Carbon monoxide is typically produced by catalytically reforming a hydrocarbon feed with steam, and optionally, carbon dioxide, at high temperatures. The reaction occurs in a steam methane reformer (SMR) which contains catalyst-filled tubes housed in a furnace. The synthesis gas exiting the reformer contains carbon monoxide (CO) along with hydrogen, carbon dioxide ($CO_2$), steam and unconverted methane according to the equilibria established in the following reactions:

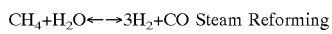
$CH_4 + H_2O \leftrightarrow 3H_2 + CO$ Steam Reforming

$H_2O + CO \leftrightarrow H_2 + CO_2$ Water Gas Shift

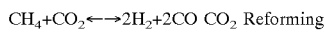
$CH_4 + CO_2 \leftrightarrow 2H_2 + 2CO$ $CO_2$ Reforming

The above-mentioned reactions are generally carried out at high temperatures (800°–1000° C.) and at high pressures (5–30 atmospheres) wherein the reactants are contacted with a nickel based catalyst. These reactions are thermodynamically controlled. Therefore, the reformate effluent composition shall depend on many variables including pressure, temperature, molar ratio of steam/methane in the reactor feed and carbon dioxide concentration in the reactor feed. A typical SMR effluent composition (mole fractions) possesses 73% $H_2$, 13% CO, 8.5% $CO_2$ and 5.5% $CH_4$ when the SMR reaction is conducted at 850° C. and 25 atmospheres using a $CO_2$-free feed mixture containing a 3:1 water/methane molar ratio. The SMR effluent is subjected to a series of reaction and separation operations in order to recover a high purity $H_2$ product (99.9+mole %) or a high purity CO product (99.5+mole %).

Carbon monoxide provided in commercial SMR plants is typically used to manufacture isocyanates and polycarbonates through phosgene chemistry. Alternatively, certain processes for producing oxoalcohols require a synthesis gas having a 1:1 ratio of hydrogen to carbon monoxide. By-product hydrogen and export steam formed during such SMR processes may have fuel value, but may not be required as products.

As is well known in the industry, synthesis gas having a high CO content is produced by injecting $CO_2$ into the reformer feedstock and by reducing the ratio of steam to hydrocarbon in the SMR feedstock. The SMR feedstock can be further enriched in $CO_2$ by recycling $CO_2$ produced and separated from the synthesis gas or recovered from the furnace flue gas or by importing additional $CO_2$ into the feedstock from an outside source. SMR feedstocks having a high $CO_2$ to methane ratio and reduced amounts of steam inhibit the water gas shift reaction from producing additional $H_2$ from CO and will reverse this reaction to produce additional CO from $H_2$ under extreme reaction conditions. Some $CO_2$ also reacts with methane in the SMR feedstock to yield syngas having a low $H_2$/CO ratio.

The amount of CO produced in conventional SMR processes is limited by reaction thermodynamics wherein a relatively low conversion to CO (~10–15%) necessitates a significant separation effort to recover the desired CO product. Numerous prior art SMR processes for producing synthesis gas are known which utilize a variety of separation cycles to recover the desired CO product from the SMR reformate effluent which typically contains a mixture of hydrogen, CO, $CO_2$ and methane.

U.S. Pat. No. 3,986,849 discloses a SMR process for converting water and a source of methane, such as natural gas, to a hydrogen product as depicted in FIG. 1. Methane and water are introduced through line 1 into a conventional SMR reactor 2 and reacted under reforming conditions to produce a $H_2$-enriched reformate stream 3. Stream 3 is introduced into condenser 4 to yield steam and cooled reformate stream 6 at an intermediate temperature of 250°–350° C. The cooled reformate is then fed into water-gas shift reactor 7 (high temperature shift reactor, alone or in combination with a low temperature shift reactor) to convert a portion of the CO in reformate stream 6 to hydrogen by reacting CO with $H_2O$ according to the reaction

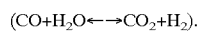
$(CO + H_2O \leftrightarrow CO_2 + H_2)$.

The above-mentioned shift reaction plays a key role in the over-all process when hydrogen is the desired product because the shift reaction increases the hydrogen concentration and quantity in the reformate product mixture prior to separating the reformate product mixture to produce essentially pure hydrogen. Shift reactor effluent 8 is further cooled to a near ambient temperature (25°–50° C.) by indirect heat exchange with cooling water in condenser 9 wherein a substantial amount of water is condensed and removed from the reformate via line 10. Finally, stream 11 exiting the condenser is introduced into a hydrogen pressure swing adsorption unit ($H_2$-PSA) to yield essentially pure hydrogen via stream 14 and a waste gas stream 13 which can be used as fuel in the reformer.

U.S. Pat. No. 4,171,206 discloses a SMR process for converting water and a source of methane such as natural gas to simultaneously yield a high purity hydrogen product and a high purity $CO_2$ product as depicted in FIG. 2. Methane and water are introduced through line 21 into a conventional SMR reactor 22 and reacted under reforming conditions to produce a reformate stream 23.

Stream 23 is introduced into condenser 24 to yield cooled reformate stream 26 at an intermediate temperature of 250°–350° C. and condensate stream (not numbered). The cooled reformate is then fed into water-gas shift reactor 27 to convert a portion of the CO in reformate stream 26 to hydrogen. Shift reactor effluent 28 is further cooled to a near ambient temperature (25–50°C.) by indirect heat exchange with cooling water in condenser 29 wherein a substantial amount of water is condensed and removed from the reformate via line 30. Finally, reformate stream 31 exiting condenser 29 is introduced into $CO_2$ vacuum swing adsorption (VSA) unit 32 wherein the reformate is separated to provide an essentially pure $CO_2$ product stream 35. The waste gas from $CO_2$ VSA unit 32 is introduced into $H_2$-PSA unit 38 via line 34 and is separated to yield an essentially pure hydrogen stream 37 and waste gas stream 36 which can be used as fuel in reformer 22. The $CO_2$ VSA unit 32 and $H_2$ PSA unit 36 are integrated to obtain maximum separation efficiency.

A conventional SMR process is depicted in FIG. 3 wherein water and a source of methane are introduced through line 41 into a conventional SMR reactor 42 and reacted under reforming conditions to produce a reformate stream 43. Stream 43 is introduced into a $CO_2$ absorber/stripper 44 which contains a physico-chemical solvent which removes $CO_2$ from the pre-cooled SMR effluent to provide stream 45 which contains essentially pure $CO_2$ and a $CO_2$-depleted reformate stream 46 which is introduced into thermal swing adsorption unit 47 to remove water and remaining $CO_2$ which is withdrawn from adsorption unit 47 via line 48. $CO_2$ and water depleted stream 49 is introduced into cryogenic cold box 50 to yield essentially pure hydrogen stream 51, essentially pure CO stream 53 and a waste stream 52 containing CO and unreacted methane which can be used as fuel in reformer 42.

Another conventional SMR process is depicted in FIG. 4 wherein water and a source of methane are introduced through line 61 into a conventional SMR reactor 62 and reacted under reforming conditions to produce a reformate stream 63. Stream 63 is introduced into a $CO_2$ absorber/stripper 64 which contains a physico-chemical solvent which removes $CO_2$ from the pre-cooled SMR effluent to provide a $CO_2$-enriched stream 65 which may be compressed via compressor 66 and reintroduced as $CO_2$ feed into SMR reactor 62 via line 67. $CO_2$ depleted reformate stream 68 exits TSA unit 69 via line 71 and is introduced into cryogenic cold box 72 to yield essentially pure hydrogen stream 73, essentially pure CO stream 75 and waste stream 74 containing CO and unreacted methane which can be used as fuel in reformer 62.

U.S. Pat. No. 4,915,711 discloses an SMR process as depicted in FIG. 5. A source of methane and water is introduced through line 81 into a conventional SMR reactor 82 and reacted under reforming conditions to produce a reformate stream 83. Alternately, a $CO_2$ stream can also be introduced into the reformer to increase CO production. Stream 83 is introduced into condenser 84 to yield water condensate stream 85 and cooled reformate stream 86 at an intermediate temperature of 30°–120° C. The cooled reformate is then fed into CO-VSA 87 wherein the reformate is separated to provide an essentially pure CO product stream 88 and waste gas stream 89 which can be used as fuel in reformer 82.

An alternate SMR process is depicted in FIG. 6 wherein a source of methane and water is introduced through line 91 into a conventional SMR reactor 92 and reacted under reforming conditions to produce a reformate stream 93. Stream 93 is introduced into condenser 94 to yield water condensate stream 95 and cooled reformate stream 96 at an intermediate temperature of 30°–120° C. The cooled reformate is then fed into CO-VSA 97 wherein the reformate is separated to provide an essentially pure CO product stream 98 and waste gas stream 99 which is introduced into a conventional polymer membrane 100 to provide waste gas stream 101 which can be used as fuel in the reformer and $CO_2$-enriched stream 102 which is compressed by compressor 103 and introduced into SMR reactor 92 via line 104 as additional feedstock.

Another alternate SMR process for producing essentially pure CO and essentially pure hydrogen is depicted in FIG. 7. A source of methane and water is introduced through line 111 into a conventional SMR reactor 112 and reacted under reforming conditions to produce a reformate stream 113. Stream 113 is introduced into condenser 114 to yield cooled reformate stream 116 which is fed into water-gas shift reactor 117 to convert a portion of the CO and water in reformate stream 116 to hydrogen. The hydrogen-enriched reformate 127 is passed through condenser 128 to remove water and water-depleted stream 129 is passed into H2-PSA unit 130 to provide waste stream 132 which can be used as fuel in reformer 112 and an essentially pure hydrogen stream 131. A portion of the reformate can be caused to flow into line 118 upon opening valve 117a. Such reformate is passed into condenser 119 to cool the gas and to remove water prior to being transferred by line 121 into CO-VSA 122 wherein the reformate is separated to provide an essentially pure CO stream 123 and a CO-depleted stream 124 which is optionally compressed by compressor or blower 125 and passed through line 126 to be combined with line 129 as passage into $H_2$-PSA 130.

Another alternate SMR process for producing essentially pure CO and essentially pure hydrogen is depicted in FIG. 8. A source of methane and water is introduced through line 201 into a conventional SMR reactor 202 and reacted under reforming conditions to produce a reformate stream 203. Stream 203 is introduced into condenser 204 to yield cooled reformate stream 206 which is fed into a CO-VSA unit 207 to provide an essentially pure CO stream 208 and a CO-depleted stream 209 which is fed into a hydrogen-PSA unit 210. The process stream is further separated in the hydrogen-PSA unit 210 to provide an essentially pure hydrogen stream 212 and a waste gas stream 211 which can be used as fuel in reformer 202.

Those of ordinary skill in the art of steam methane reforming are searching for improved reforming processes wherein conversion to the desired CO product and hydrogen product is maximized. Moreover, a process which facilitates the reaction of $CO_2$ and hydrogen to form CO and water [reverse water gas shift reaction] would be highly desirable. Unfortunately, no prior art SMR process integrations are known in the art for directly converting $CO_2$ and hydrogen present in a process stream to CO and water. The reverse water gas shift reaction is thermodynamically unfavorable at temperatures below 800° C. and temperatures typically in excess of 1000° C. are required in order to obtain moderate conversion of $CO_2$ to CO. Thus, the reverse water gas shift reaction has not been successfully integrated into a SMR process for producing CO.

Moreover, prior art processes for conducting simultaneous reaction and adsorption steps have not achieved commercial success because product flow rates do not remain sufficiently constant and the desired products are present in unacceptably low concentrations with respect to the undesired reaction products, unreacted feedstock and purge fluids. Industry is searching for ways to improve the SMR processes for simultaneously producing CO and hydrogen.

BRIEF SUMMARY OF THE INVENTION

The present invention is a process for producing an essentially pure carbon monoxide (CO) product and an essentially pure hydrogen product by reforming methane and steam in the presence of a reforming catalyst to produce a reformate product enriched in CO, carbon dioxide and hydrogen. The reformate is subjected to an integrated series of separation steps and carbon dioxide and hydrogen present in a portion of the waste effluent recovered from such series of separation steps is shifted to CO in an integrated sorption enhanced reaction (SER) process.

The claimed process overcomes problems associated with prior art processes for reforming methane and water to carbon monoxide which typically suffer from producing a reformate which contains an inordinate amount of $CO_2$ which is not converted to the desired CO product and which must be separated from the reformate by a costly separation cycle. Moreover, the claimed process overcomes problems associated with the thermodynamic limitations associated with the reverse water gas shift reaction wherein $CO_2$ and hydrogen are converted to CO and water.

Applicants' invention solves these problems by subjecting the SMR reformate to a first separation to produce a substantially pure CO product and a CO-depleted product and subjecting the CO-depleted stream to another separation to form an essentially pure hydrogen product and a hydrogen depleted stream. Carbon dioxide present in the hydrogen depleted stream is reacted with hydrogen by utilizing a sorption enhanced reaction (SER) process which permits the reverse water gas shift reaction to be carried out with high conversion of $CO_2$ to CO at moderate temperatures of between 250° to 350° and at a pressure of 5 to 30 atmospheres. The resulting CO-enriched stream is recycled for CO recovery.

Applicants' process integrates an SER process which utilizes a series of cyclic steps performed in a plurality of reactors to shift $CO_2$ to CO and to separate the shift gas product mixture into an enriched CO stream. Each reactor contains an admixture of a shift catalyst and a water adsorbent wherein water is selectively removed from the reaction zone by physical adsorption under shift reaction conditions thereby moving the reaction equilibrium toward formation of desirable CO. The adsorbed water is separated from the adsorbent by utilizing a series of purge and depressurization steps which are performed according to a predetermined timed sequence. Thus, Applicants' SER process which is integrated into the claimed process represents an entirely new process for simultaneously obtaining high conversion of $CO_2$ to CO, for producing an enriched CO effluent stream, for efficiently desorbing water from the adsorbent and for preparing each reactor for the next process cycle.

The general embodiment of Applicants' process for producing a CO product and a hydrogen product comprises an initial step of reacting a feedstock comprising methane and water in the presence of a steam-methane reforming catalyst at a temperature ranging from 700° C. to 1000° C. and a pressure ranging from 2 to 50 atmospheres to form a reformate comprising hydrogen, carbon monoxide, carbon dioxide and unreacted feedstock.

The second step of the general embodiment comprises removing water from the reformate to form a water-depleted reformate and separating the water-depleted reformate into the CO product and a CO-depleted stream.

The third step of the process contemplates separating the CO-depleted stream into the hydrogen product and a hydrogen depleted stream and compressing the hydrogen depleted stream to form a pressurized hydrogen depleted stream.

The fourth step of the general embodiment comprises introducing the hydrogen-depleted stream into a plurality of reactors operated in a predetermined timed sequence and according to the following steps which are performed in a cycle within each reactor:

(1) reacting the pressurized hydrogen depleted stream at a first pressure in a first reactor containing an admixture of a water adsorbent and a water gas shift catalyst under reaction conditions sufficient to convert carbon dioxide and hydrogen to carbon monoxide and to adsorb water onto the adsorbent and to form a CO-enriched stream which is recycled into the water-depleted reformate steam of the second step;

(2) countercurrently depressurizing the first reactor to a second pressure by withdrawing a mixture comprising hydrogen, carbon dioxide, carbon monoxide and water;

(3) countercurrently purging the first reactor at the second pressure with a weakly adsorbing purge fluid with respect to the adsorbent to desorb water from the adsorbent and withdrawing a mixture comprising weakly adsorbing purge fluid, unreacted feedstock, carbon monoxide and water;

(4) countercurrently purging the first reactor at the second pressure with a CO-enriched purge fluid which does not comprise hydrogen and carbon dioxide to desorb the weakly adsorbing purge fluid and withdrawing a mixture comprising the weakly adsorbing purge fluid, carbon monoxide and water; and (5) countercurrently pressurizing the first reactor from the second pressure to the first pressure with the CO-enriched purge fluid prior to commencing another process cycle within the first reactor.

Additional steps may be performed under the general embodiment. For example, a source of hydrogen or carbon dioxide may be introduced into the hydrogen-depleted stream of the third step in order to control the ratio of hydrogen and carbon dioxide present in the first reactor according to substep (1) of the fourth step. Alternately, the first reactor can be countercurrently purged at the first pressure with a weakly adsorbing purge fluid following substep (1) and prior to performing substep (2) wherein a mixture comprising unreacted feedstock, carbon monoxide and water is withdrawn from the reactor.

Suitable catalysts for conducting the steam-methane reforming reaction according to the general and alternate embodiments include conventional steam-methane reforming and prereforming catalysts such as nickel-alumina, nickel-magnesium alumina and the noble metal catalysts.

As stated in the general embodiment, the SER cycle contemplates conducting the reverse water gas shift reaction within a plurality of reactors containing an admixture of a water adsorbent and a water gas shift catalyst The admixture of the adsorbent and the catalyst typically comprises from 5% to 95% by weight of the adsorbent and from 95% to 5% by weight of the catalyst. Suitable water adsorbents include those selected from the group consisting of zeolites, alumina or silica gel. Suitable water gas shift catalysts include those selected from the group consisting of iron -chromium high temperature shift catalyst, copper/zinc oxide low temperature shift catalyst and copper/zinc oxide medium temperature shift catalyst.

As shall become more apparent upon reading the Detailed Description of the Invention, Applicants' process overcomes problems associated with prior art processes by utilizing a novel series of reaction, adsorption and desorption steps to convert $CO_2$ present in a waste stream originating from a hydrogen-PSA to CO and to separate and collect CO in substantially enriched form under a relatively constant flow rate at feedstock pressure. This result is accomplished in part by Applicants' unexpected use of a reaction product, CO or an enriched CO stream, to purge the SER reactors and to pressurize the reactors to reaction pressure prior to commencing another SER cycle.

While one of ordinary skill in the art would expect that the purging and pressurizing of the SER reactor with a product of the reverse water gas shift reaction prior to commencing the reaction step would undesirably shift the equilibrium constant toward formation of $CO_2$ and hydrogen, Applicants have discovered that purging the SER reactors with product gas instead of $CO_2$ or hydrogen reactants or alternate purge fluid provides a highly efficient process wherein a CO-enriched stream can be collected at feedstock pressure at a relatively constant flow rate.

DETAILED DESCRIPTION OF THE INVENTION

Applicants will now discuss in greater detail their process for producing an essentially pure CO product and an essentially pure hydrogen product which provides numerous benefits over prior art processes. Specifically, greater conversion of reformer feedstock to CO product is achieved by reacting a $CO_2$ and hydrogen present in the hydrogen-PSA waste stream to form CO via the reverse water gas shift reaction. This approach is not economically feasible absent Applicants' novel integration of their SER cycle since the reverse water gas shift reaction requires temperatures in excess of 1000° C. in order to provide sufficient conversion to CO.

Figure 9:
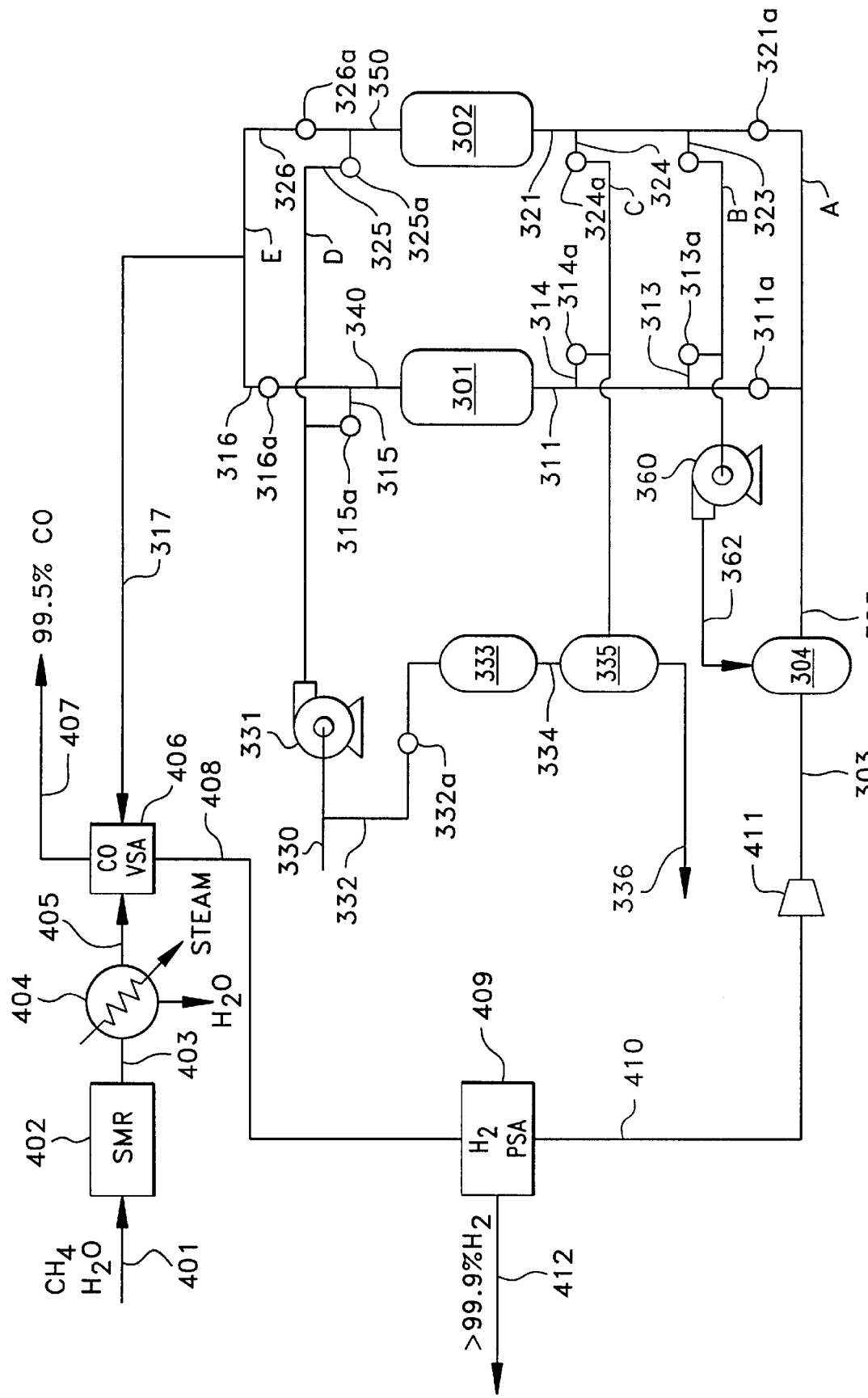
FIG. 9 illustrates the general embodiment of the claimed SMR process for making an essentially pure CO stream and an essentially pure hydrogen stream wherein methane and water are reacted in the presence of a catalyst to form a reformate product comprising carbon dioxide, carbon monoxide and hydrogen. The SMR reformate is sent to a first separator to produce a substantially pure CO product and a CO depleted stream which is subjected to another separation to form an essentially pure hydrogen product and a hydrogen depleted stream. $CO_2$ present in a portion of the hydrogen depleted stream is reacted with hydrogen by utilizing Applicants' sorption enhanced reaction (SER) process in order to produce additional quantities of CO by the overall process.

The general embodiment of Applicants process is described in FIG. 9 which illustrates a process flow diagram which depicts a steam methane reformer 402, condenser 404, SER reactors 301 and 302; numerous control valves; manifolds A through E; pumps 331 and 360; separator 335; and surge vessels 304 and 333 (optional). Referring to FIG. 9, a hydrocarbon feedstock, e.g. methane or natural gas, is desulfurized in a vessel (not shown) using an adsorbent as is well known in the art. The desulfurized hydrocarbon feedstock is mixed with steam to form a mixed reformer feedstock represented by stream 401. Feedstock 401 is preheated in a preheater (not shown) and introduced into SMR reformer 402. Such reformers are well known in the art and are heated by firing a mixture of fuel and air (not shown). The reformer typically operates at temperatures of 800° to 1000° C. and pressures of 5 to 30 atmosphere and produces a reformate consisting of about 73% hydrogen, 13% CO, 9% $CO_2$ and 5% methane on a dry basis. The reformate is sent through line 403 to a condenser 404 where the gas temperature is reduced and some of the water in the gas is removed by condensation and some steam is generated.

The water depleted reformate 405 is admitted into a conventional CO-VSA unit 406 which is operated at 80°–120° C. to form a CO product stream 407 and a CO-depleted stream 408. The CO product stream 407 has a purity of at least 99.5%. The CO-depleted stream 408 is admitted in a conventional $H_2$-PSA unit 409 wherein such stream is separated into a hydrogen product stream 412 and a hydrogen depleted stream 410. The hydrogen product stream 412 has a purity of at least 99.9%.

Applicants' process provides an improved scheme to convert the $CO_2$ and hydrogen present in the hydrogen depleted stream to CO via an integrated SER process for conducting the reverse water gas shift reaction and for producing a CO-enriched recycle stream which can be recycled to the CO-VSA for recovery of additional CO. The hydrogen depleted stream 410 is compressed to a first pressure in compressor 411 to provide a pressurized hydrogen depleted stream 303 which is passed through line 303 into surge vessel 304 (optional) wherein fluid is transferred through line 305 into a heater (not shown) to form a heated pressurized hydrogen-depleted stream which is routed into Manifold A. The remaining portion of FIG. 9 represents the SER process wherein the heated pressurized hydrogen depleted stream shall be subject to a reverse shift reaction in a plurality of reactors operated in cycle to convert $CO_2$ and hydrogen in the process stream to CO and water via the reverse water gas shift reaction and to recover a CO-enriched stream which is recycled via Line 317 into CO-VSA 406 for recovery of CO. While FIG. 9 illustrates line 317 and line 405 as entering the CO-VSA 406 for discussions purposes, one of ordinary skill in the art will appreciate that these two respective stream may be combined into a single stream.

Manifold A is in flow communication with branch inlet lines 311 and 321 which are connected to the inlet ends of reactors 301 and 302. Lines 311 and 321 are equipped with valves 311*a* and 321*a*, respectively. Opening of the appropriate valve permits the pressurized heated hydrogen-depleted stream to flow through manifold A into the selected reactor being initially placed on stream. Thus, by opening valve 311*a*, while valve 321*a* is closed, the stream may be caused to flow from manifold A, through line 311 and into reactor 301.

Reactors 301 and 302 are fitted at their respective outlet ends with lines 340 and 350 respectively, each equipped with control valves 316*a* and 326*a*, respectively. Lines 340 and 350 are operatively connected to manifold E via lines 316 and 326 through which a CO-enriched stream withdrawn from reactors 301 and 302 is admitted into Line 317 and into CO-VSA 406 for fuel value or recycle. Thus, by opening the appropriate valve 316*a* or 326*a*, the CO-enriched mixture is caused to flow from the corresponding reactor through lines 340 and 316 or lines 350 and 326 into manifold E for passage into Line 317.

Reactors 301 and 302 are operatively connected to lines 311 and 321, each of which is in flow communication with lines 313 and 323. Lines 313 and 323 are provided with control valves 313*a* and 323*a*, respectively, such lines being in flow communication with manifold B. Manifold B can be placed in flow communication with reactor 301 or 302 via lines 313 and 323 upon opening valve 313*a* or 323*a*, respectively. Manifold B is also in flow communication with pump 360 which is connected to line 362 which can be recycled into surge vessel 304.

Manifold C is in flow communication with reactors 301 and 302 via lines 314 and 324, each line which is equipped with valves 314*a* and 324*a*, respectively. Regeneration effluent from reactors 301 and 302 may be passed through lines 314 and 324 into manifold C for separation in separator 335 into stream 336 which is a water-enriched product stream and stream 334 comprising weakly adsorbing purge fluid which can be passed into storage tank 333 (optional) for later use.

Manifold D is connected to pump 331 which receives various process fluids via lines 330 and 332. Such process fluids pass through line 330 or line 332 and are pressurized via pump 331. The pressurized fluids may be passed through manifold D which is in flow communication with reactors 301 and 302 via lines 315 and 325, respectively. Lines 315 and 325 are each fitted with valves 315*a* and 325*a* such that the flow of streams from Manifold D into reactors 301 and 302 can be controlled. Moreover, weakly adsorbing purge fluid can be transferred to pump 331 via line 332 by opening valve 332*a* or by importing weakly adsorbing purge fluid via line 330.

Operation of the SER cycle of the general embodiments represented in FIG. 9 will now be explained in connection with an arbitrarily chosen cycle having eight timed periods of ten minutes per period as set forth in Table 1. Although not limited thereto, the SER process as illustrated in FIG. 9 utilizes reactors 301 and 302 which are operated in cycle according to a predetermined timed sequence. Other arrangements using fewer or a greater number of reactors and the associated gas manifolds and switch valves may be employed, optionally using interrupted or discontinuous operation (using idling) of pumps. Other arrangements using more than two reactors may be employed by appropriate sequencing of the individual steps or periods of the process cycle.

According to the general embodiment of FIG. 9, each of the reactors 301 and 302 undergo four periods of the reaction/adsorption step, referred to as the sorpreaction step, one period of the depressurization step, one period of the Purge I step, one period of the Purge II step, and one period of the pressurization step. As illustrated in Table 1, the steps undertaken at startup in each of reactors 301 and 302 are staggered to enable at least one of the two reactors to undergo the sorpreaction step at all times during the process cycle. The operation of the invention described in FIG. 9 involves principally the following sequence of steps: In applying the following steps, the first pressure ranges from 2 atmospheres to 50 atmospheres and the second pressure ranges from 0.05 to 2 atmospheres.

TABLE 1

| Steps | Time Minutes | 311a | 313a | 314a | 315a | 316a | 332a | 321a | 323a | 324a | 325a | 326a | 332a | Steps ReactorSorber II |
|---|---|---|---|---|---|---|---|---|---|---|---|---|---|---|
| Sorpreaction | 0 to 10 | O | C | C | C | O | C | C | O | C | C | C | C | Depressurize |
| Sorpreaction | 10 to 20 | O | C | C | C | O | C | C | C | O | O | C | C | Purge I |
| Sorpreaction | 20 to 30 | O | C | C | C | O | C | C | C | O | O | C | C | Purge II |
| Sorpreaction | 30 to 40 | O | C | C | C | O | C | C | C | C | O | C | C | Pressurize |
| Depressurize | 40 to 50 | C | O | C | C | C | C | O | C | C | C | O | C | Sorpreaction |
| Purge I | 50 to 60 | C | C | O | O | C | C | O | C | C | C | O | C | Sorpreaction |
| Purge II | 60 to 70 | C | C | O | O | C | C | O | C | C | C | O | C | Sorpreaction |
| Pressurize | 70 to 80 | C | C | C | O | C | C | O | C | C | C | O | C | Sorpreaction |

(a) SORPREACTION—the heated pressurized hydrogen depleted stream (feedstock) at a first predetermined pressure is passed through the reactor containing an admixture of shift catalyst and adsorbent preferentially selective toward water wherein a CO-enriched stream is withdrawn from the reactor. Water is selectively adsorbed by the adsorbent and a reaction mass transfer zone (RMTZ) is formed inside the reactor which moves toward the outlet or discharge end of the reactor as more feedstock is passed through the reactor. The adsorbent at the leading edge of the RMTZ is essentially free of the adsorbed water while the trailing edge of the RMTZ is equilibrated with water at the local conditions. The sorpreaction step is continued until the adsorbent in the reactor is essentially saturated with water. In other words, the sorpreaction step ends once the adsorption RMTZ has reached the effluent end of the reactor or somewhat short of it. The CO-enriched stream is discharged from the reactor.

(b) DEPRESSURIZATION—the reactor is countercurrently depressurized to a second predetermined pressure by withdrawing a mixture comprising unreacted feedstock, CO and water. The depressurization step is continued until the reactor reaches the second predetermined pressure.

(c) PURGE I—the reactor is countercurrently purged at the second pressure with a weakly adsorbing purge fluid to desorb water from the adsorbent and a mixture comprising weakly adsorbing purge fluid, unreacted feedstock, a portion of CO and a portion of water is withdrawn from the reactor.

(d) PURGE I—the reactor is countercurrently purged at the second pressure with a CO-enriched purge fluid which does not contain $CO_2$ and hydrogen to desorb the weakly adsorbing purge fluid and a mixture comprising the weakly adsorbing purge fluid, CO and water is withdrawn from the reactor.

(e) PRESSURIZATION—the reactor is countercurrently pressurized from the second pressure to the first pressure with CO-enriched purge fluid prior to commencing another SER process cycle within the reactor.

The valve positions during the above-mentioned operating cycle are also set forth in Table 1. The designation "O" indicates that a specified valve is open while a "C" represents that a specified valve is closed. The operative sequence of steps occurring in reactor 301 during a complete process cycle will now be described in exhaustive detail so that operation of a continuous process will be fully understood. The identical sequence of steps according to Table 1 occurs in staggered sequence in reactor 302.

Again, referring to the embodiment disclosed in FIG. 9 and the sequence periods and valve positions designated in Table 1, reactor 301 undergoes four sequence periods of the sorpreaction step. Feedstock stored in storage tank 304 (optional), is introduced into reactor 301 by opening valves 311a and 316a and closing valves 313a, 314a and 315a thereby allowing feedstock to flow through manifold A, line 311 and into reactor 301 which contains an admixture of a desired shift catalyst and a water-selective adsorbent.

The sorpreaction is continued until reactor 301 is essentially saturated with adsorbed water. Water is selectively adsorbed onto the adsorbent and a reaction mass transfer zone (RMTZ) is formed within reactor 301 which moves toward the discharge end of reactor 301 as more feedstock is passed. The sorpreaction is completed when the MTZ reaches the effluent end of the reactor or somewhat short of it by a predesigned set point.

A CO-enriched stream exits the discharge end of reactor 301 via lines 340 and 316 and flows into manifold E and into Line 317 as previously discussed. The process proceeds with one period of the depressurization step wherein reactor 301 is countercurrently depressurized to a second predetermined pressure by withdrawing a mixture comprising unreacted feedstock, CO and water from the inlet end of reactor 301. Valve 313a is opened while valves 311a and 314a remain closed allowing the mixture to be passed through lines 311 and 313 into manifold B and in flow communication with pump 360. The mixture exits the discharge end of pump 360 proceeding via line 362 for use as fuel (not shown) or recycle into surge drum 304 for use as feedstock in a subsequent process cycle. The depressurization step is continued until the reactor reaches the second predetermined pressure.

Reactor 301 is then subjected to one period of the purge I step. Reactor 301 is countercurrently purged at the second pressure with weakly adsorbing purge fluid. Upon opening valves 314a and 315a while valves 325a and 332a remain in the closed position, weakly adsorbing purge fluid from an external source passes through pump 331 via line 330 and exits pump 331 at the second pressure to proceed via manifold D, line 315 and line 340 into the exit end of reactor 301. A mixture comprising weakly adsorbing purge fluid, unreacted feedstock, CO and water is withdrawn from reactor 301 via line 311, line 314 and manifold C and is collected in separator 335. This mixture may be used as fuel, discharged for use outside the process or separated in separator 335 to form a stream of weakly adsorbing purge gas 334 and a water enriched stream 336. A portion of the weakly adsorbing purge fluid may be transferred through line 334 into storage tank 333 for future use. Upon demand via opening valve 332a, weakly adsorbing purge fluid may be drawn to pump 331 via lines 332 and 330 for use in subsequent process cycles.

Reactor 301 is then subjected to one period of the purge II step wherein reactor 301 is countercurrently purged with a CO-enriched fluid which does not contain both hydrogen and $CO_2$. Upon opening valves 314a and 315a while valves 325a and 332a remain in the closed position, the CO-enriched purge fluid from an external source passes through pump 331 via line 330 and exits pump 331 at the second pressure to proceed via manifold D, line 315 and line 340 into the exit end of reactor 301. A mixture comprising weakly adsorbing purge fluid, water and CO-enriched purge fluid is withdrawn from reactor 301 via line 311, line 314 and manifold C and is collected in separator 335. This mixture may be used as fuel or discharged for use outside the process.

The final step of the process cycle involves a single sequence of the pressurization step wherein reactor 301 is countercurrently pressurized from the second pressure to the first pressure with a CO-enriched purge fluid, for example a slip stream from Line 317, or high purity CO product stream 407 prior to commencing another process cycle within the reactor. Specifically, upon opening valve 315a while valves 311a, 313a, 314a, 325a and 332a remain in the closed position, the CO-enriched purge fluid passes through pump 331 via line 330 and exits pump 331 at the second pressure to proceed via manifold D, line 315 and line 340 into the exit end of reactor 301. This step is stopped when reactor 301 reaches the first pressure.

The process proceeds through additional cycles according to the above-mentioned steps enumerated in Table 1. While the sequence periods are depicted as being of equal length, this is neither required or necessary. The times will be set by allowable maximum gas flow rates, valve and line sizes and the properties of the adsorbent used. Alternate routines may be employed for establishing the duration of each of the cycle steps. For example, the end of a particular step may be determined by other techniques known in the art such as by analysis of the composition of the reactor effluent.

Several variations to the general embodiment may be practiced to meet the particular needs of each plant. For example, each reaction may be subjected to an additional countercurrent Purge step at the first pressure with a weakly adsorbing purge fluid between the sorpreaction step and the depressurization step and withdrawing a mixture comprising unreacted feedstock, CO and water which can be recycled as feed to the SER reactors via manifold B, pump 360 and line 362.

Moreover a source of hydrogen or carbon dioxide (not shown) may be introduced into the hydrogen depleted stream 410 in order to control the ratio of hydrogen and $CO_2$ present in the first reactor of the SER process.

One of ordinary skill in the art will appreciate that methane may build up during operation of the claimed process unless a suitable slip stream (not shown) is withdrawn from stream 410 prior to reaction and recycle to the CO-VSA unit 406. This slip stream would typically be used as fuel to the SMR 402.

Suitable catalysts for conducting the steam-methane reforming reaction include conventional steam-methane reforming and prereforming catalysts such as nickel-alumina, nickel-magnesium alumina and the noble metal catalysts.

Suitable water gas shift catalysts for conducting the reverse shift reaction in the reactors or the SER cycle include conventional shift catalysts such iron-chromium high temperature shift catalyst, copper-zinc oxide low temperature shift catalyst and copper/zinc oxide medium temperature shift catalyst.

The water adsorbents to be used in the reactors of the integrated SER process must be active at the reaction conditions meaning that such the adsorbent must retain its capacity and selectivity for the more adsorbable product. Second, the adsorbent must be chemically neutral and must not act as a catalyst for the reverse water gas shift reaction.

The term, weakly adsorbing fluid, refers to a fluid which is capable of displacing the product which is adsorbed by the adsorbent during operation of the process and which can then be desorbed by the less adsorbing product such that subsequent process cycles can be conducted in each reactor. One of ordinary skill in the art can readily select one or a mixture of weakly adsorbing fluids suitable for use in the claimed invention.

The general and alternate embodiments of the present invention can be operated using conventional hardware. For example, suitable reactors include any vessel which is capable of being subjected to the reaction conditions required to practice a particular equilibrium controlled process such as shell and tube reactors. Moreover, the separators enumerated in the process are readily selected by one of ordinary skill in the art based upon considerations such as the particular mixtures to be separated, the volume of fluids to be separated and the like.

The following examples are provided to further illustrate Applicants' process for producing CO. The examples are illustrative and are not intended to limit the scope of the appended claims.

EXPERIMENTAL SECTION

The following examples are provided to further illustrate Applicants' claimed process for producing CO which integrates a conventional SMR process with an SER cycle which shifts $CO_2$ present in a separation unit waste gas stream to CO via the reverse water gas shift. The examples are illustrative and are not intended to limit the scope of the appended claims.

Mass balance calculations were carried out for selected processes depicted in the Figures. Thermodynamic equilibrium calculations used to determine the steam methane reformer effluent composition were carried out using a software package entitled "HSC Chemistry for Windows", from Outokumpu Research Oy, Finland. All other calculations were within the ordinary pervue of one of ordinary skill in the art of chemical engineering. The following assumptions were utilized in making the calculations:

a) the reformate product composition is dictated by equilibrium conversion of the reformer products at constant temperature and pressure;

b) the steam methane reformer operates at 850° C. and 25 atmosphere pressure;

c) the feed stream to the reformer contains 25 moles/min of $CH_4$ and 75 moles/min of $H_2O$;

d) the CO-VSA process produces essentially pure CO product (99.5%) at 85% carbon monoxide recovery;

e) the H2-PSA process produces essentially pure H2 product (99.9%) at 85% hydrogen recovery;

f) the conversion of $CO_2$ to CO in the Sorption Enhanced Reactor Process (SERP) is 80% (i.e., 80% of the $CO_2$ fed to the reactor is withdrawn as CO product from the reactor);

EXAMPLE 1

Figure 1:
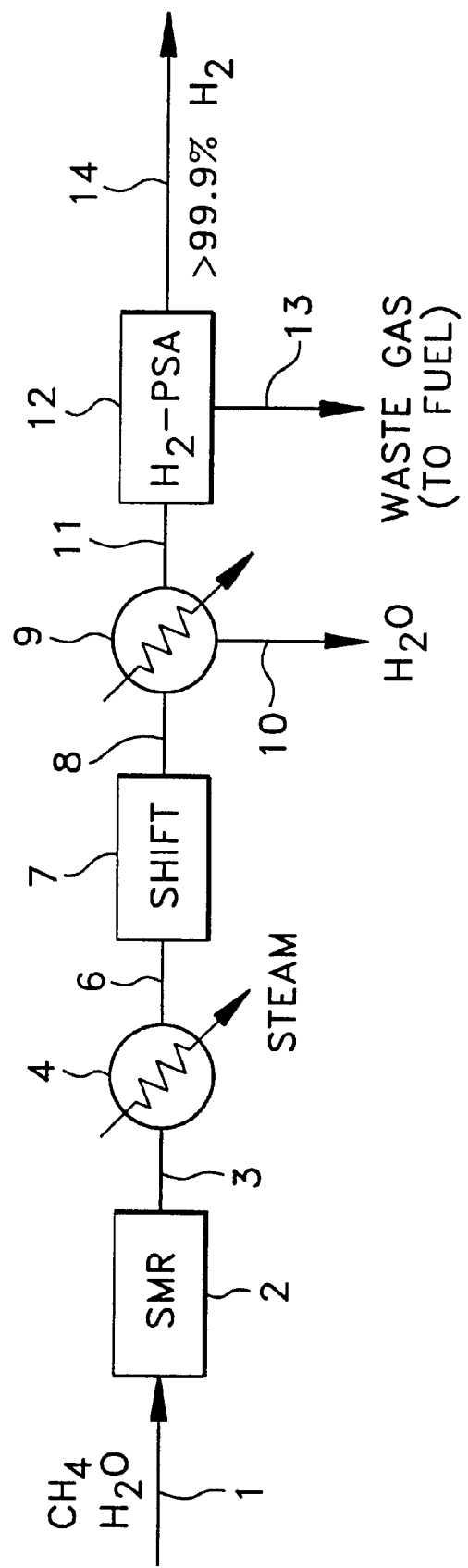
FIG. 1 illustrates a steam methane reforming (SMR) process according to U.S. Pat. No. 3,986,849 wherein SMR reactor reformate is further reacted in a shift reactor and is separated in a hydrogen pressure swing adsorption ($H_2$-PSA) unit to provide a highly pure hydrogen product.
Figure 2:
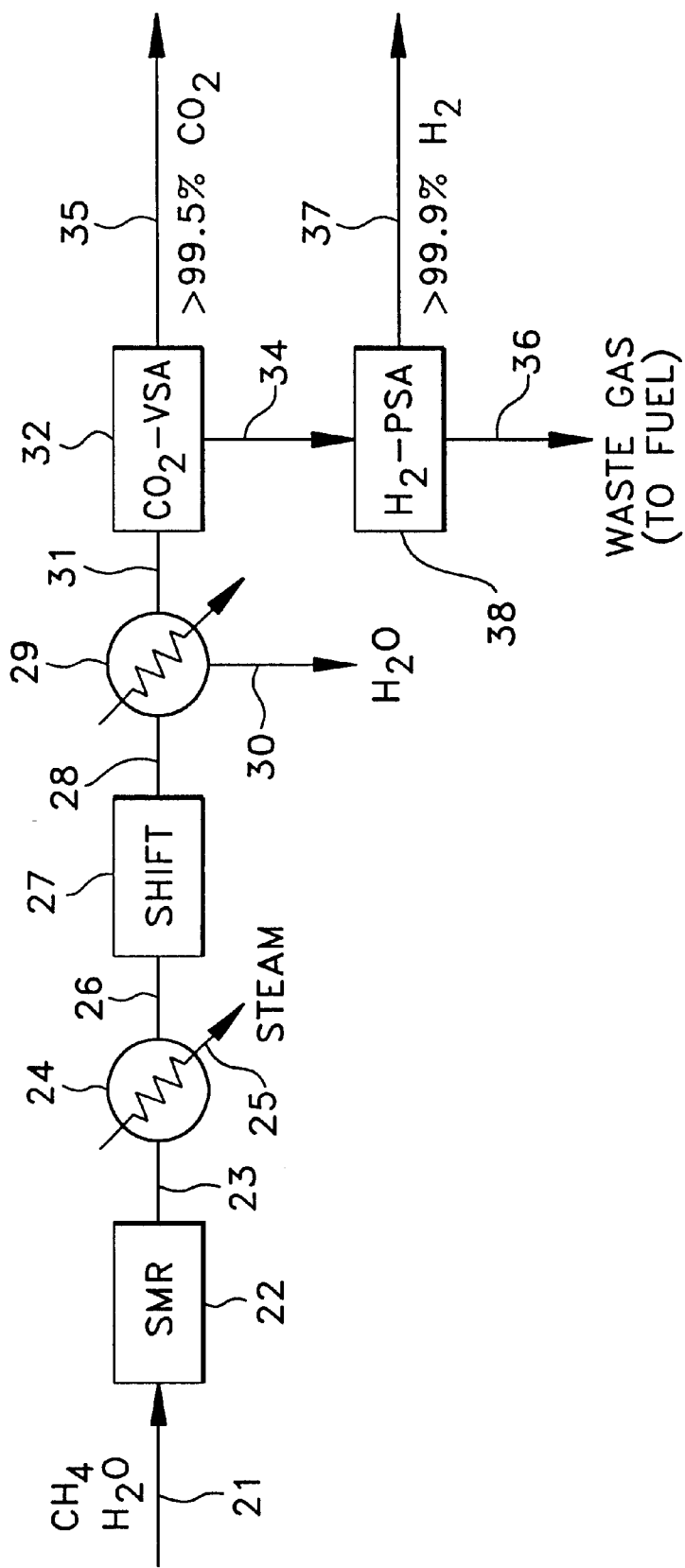
FIG. 2 illustrates a SMR process according to U.S. Pat. No. 4,171,206 wherein SMR reactor reformate is further reacted in a shift reactor and is separated by utilizing an integration of a $CO_2$-VSA unit and a $H_2$-PSA unit to provide an essentially pure stream of carbon dioxide and an essentially pure stream of hydrogen.
Figure 3:
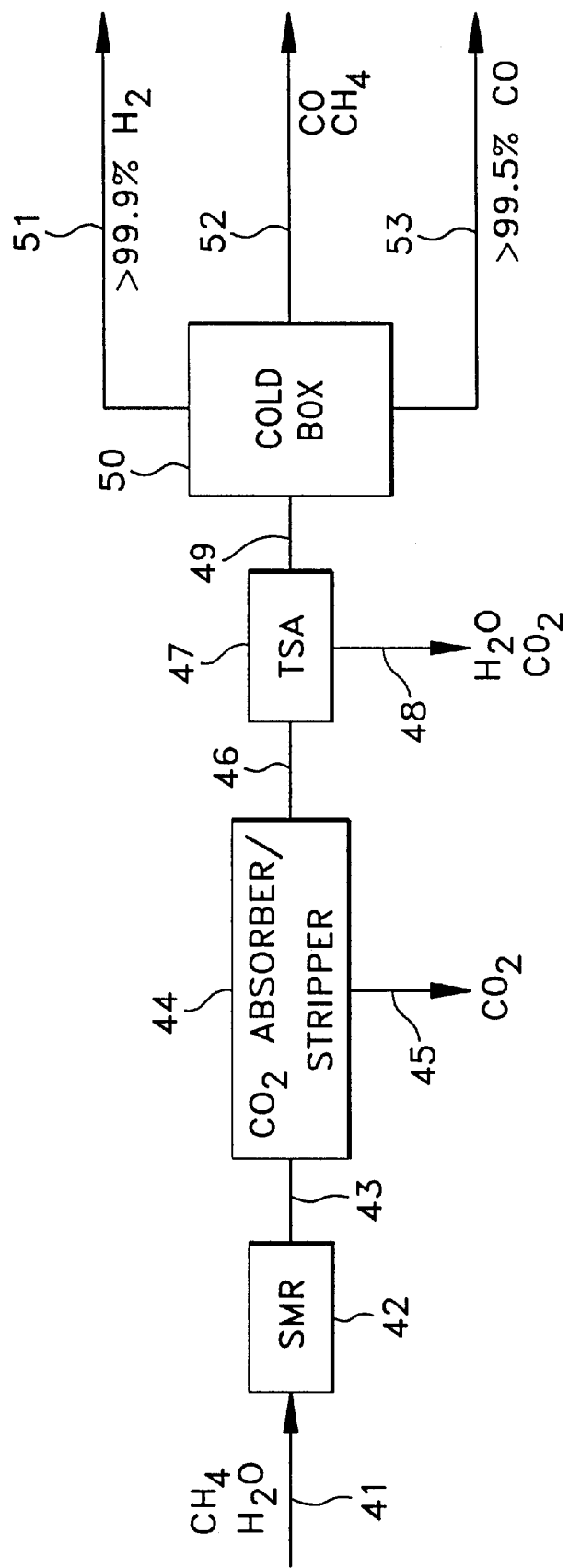
FIG. 3 illustrates a prior art SMR process which utilizes a $CO_2$ absorber/stripper to remove $CO_2$ from the reformate stream prior to introducing the reformate stream into a thermal swing adsorption (TSA) unit to further remove water and carbon dioxide prior to final separation in a cryogenic cold box to yield an essentially pure hydrogen stream, an essentially pure CO stream and a waste gas stream containing methane and CO which can be used as fuel in the reformer.
Figure 4:
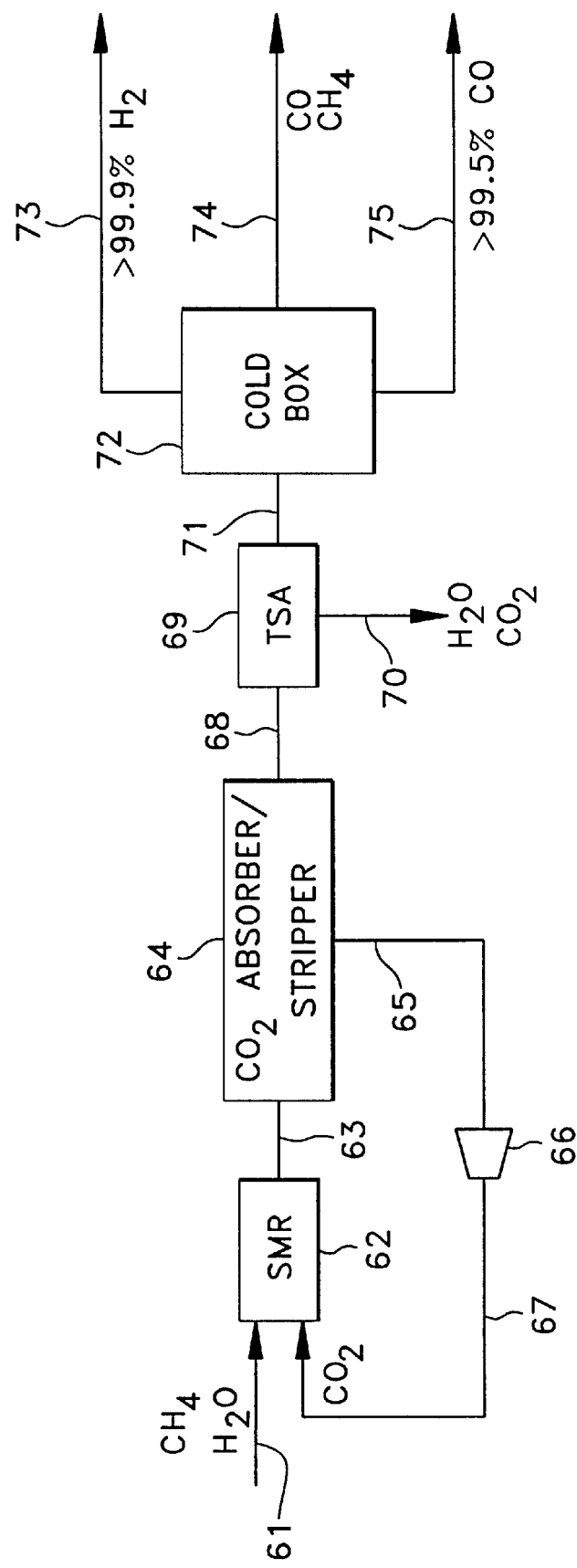
FIG. 4 illustrates a modified version of the process according to FIG. 3 wherein a $CO_2$ absorber/stripper is utilized to remove $CO_2$ from the reformate stream prior to introducing the stream into TSA unit to further remove water and $CO_2$ from the reformate. A portion of the $CO_2$ separated by the adsorber/stripper is compressed and recycled into the SMR for further conversion to hydrogen and CO.
Figure 5:
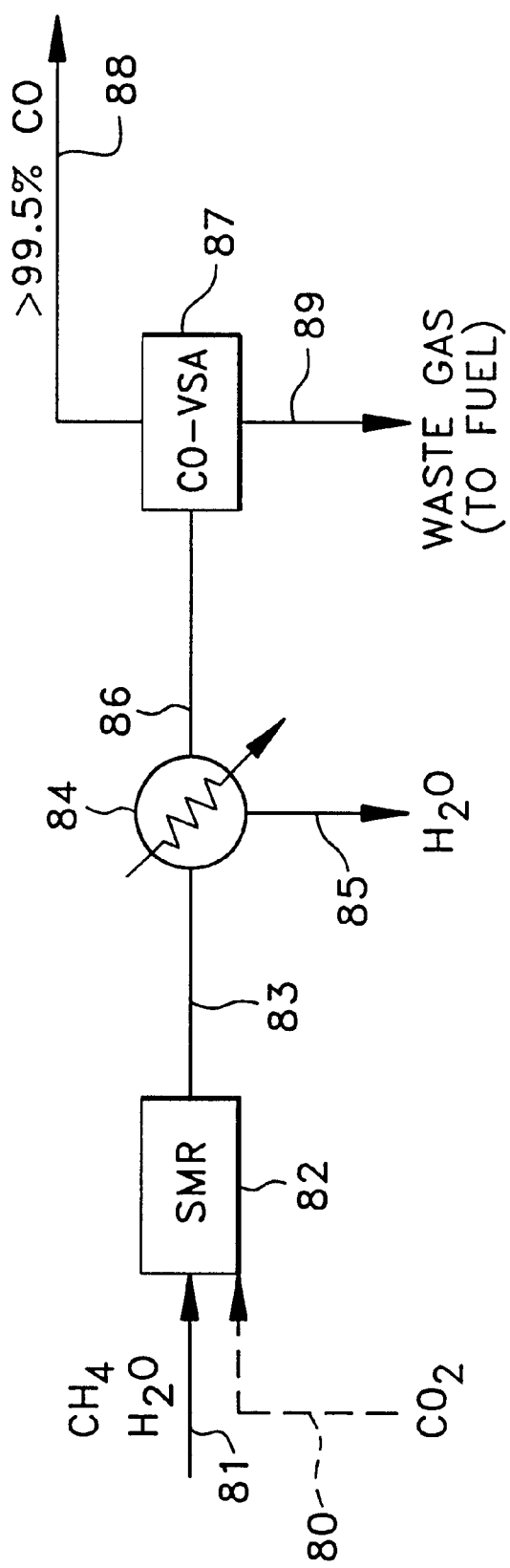
FIG. 5 illustrates a prior art SMR process for producing essentially pure CO wherein the SMR reformate is condensed to remove water prior to separating the reformate in a CO-VSA to provide an essentially pure CO product and a waste gas stream which can be recycled as fuel to the reformer.
Figure 6:
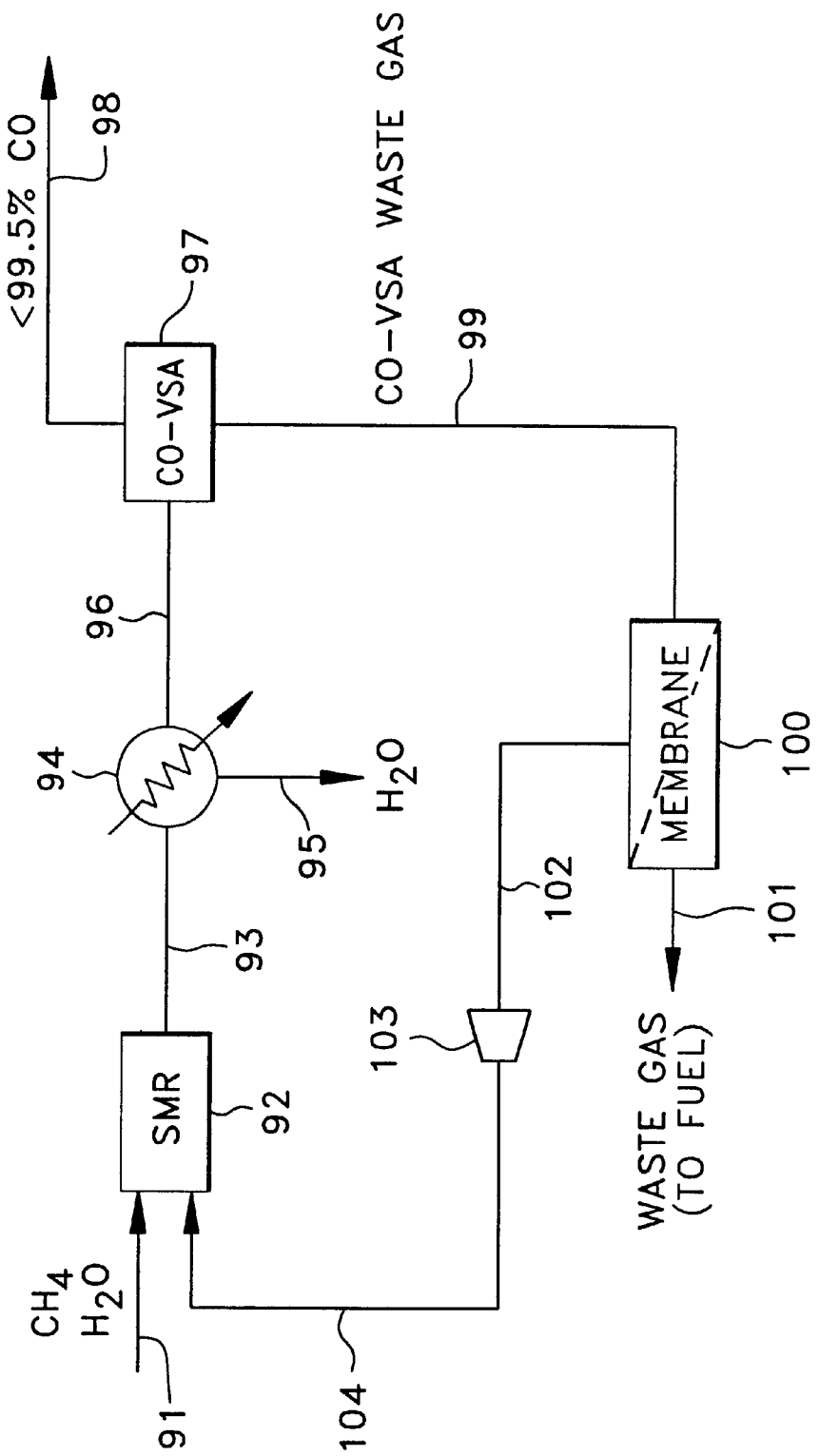
FIG. 6 illustrates a modified version of FIG. 5 wherein the waste gas stream recovered from the CO-VSA is contacted with a permselective polymeric membrane to provide a waste gas stream which can be recycled as fuel to the reformer and a $CO_2$-enriched stream which is compressed and reintroduced into the SMR reactor for further conversion to CO and hydrogen.
Figure 7:
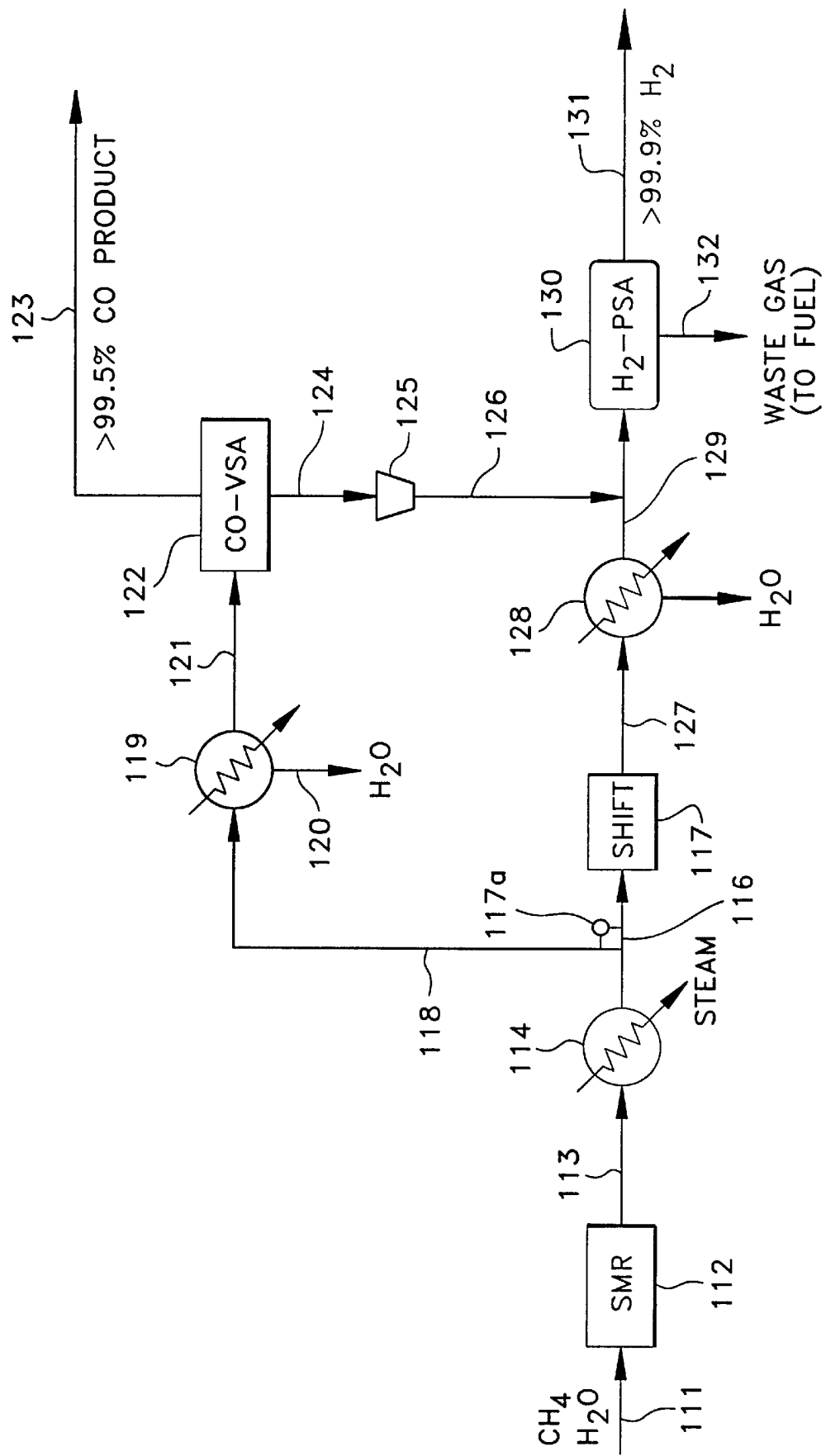
FIG. 7 illustrates a prior art SMR process wherein SMR reactor reformate is separated into a first stream which is introduced into a shift reactor and a second stream which is introduced into a CO-VSA to yield an essentially pure CO product and a CO-depleted stream which is combined with the shift reactor effluent and separated in a $H_2$-PSA unit to provide an essentially pure hydrogen product.
Figure 8:
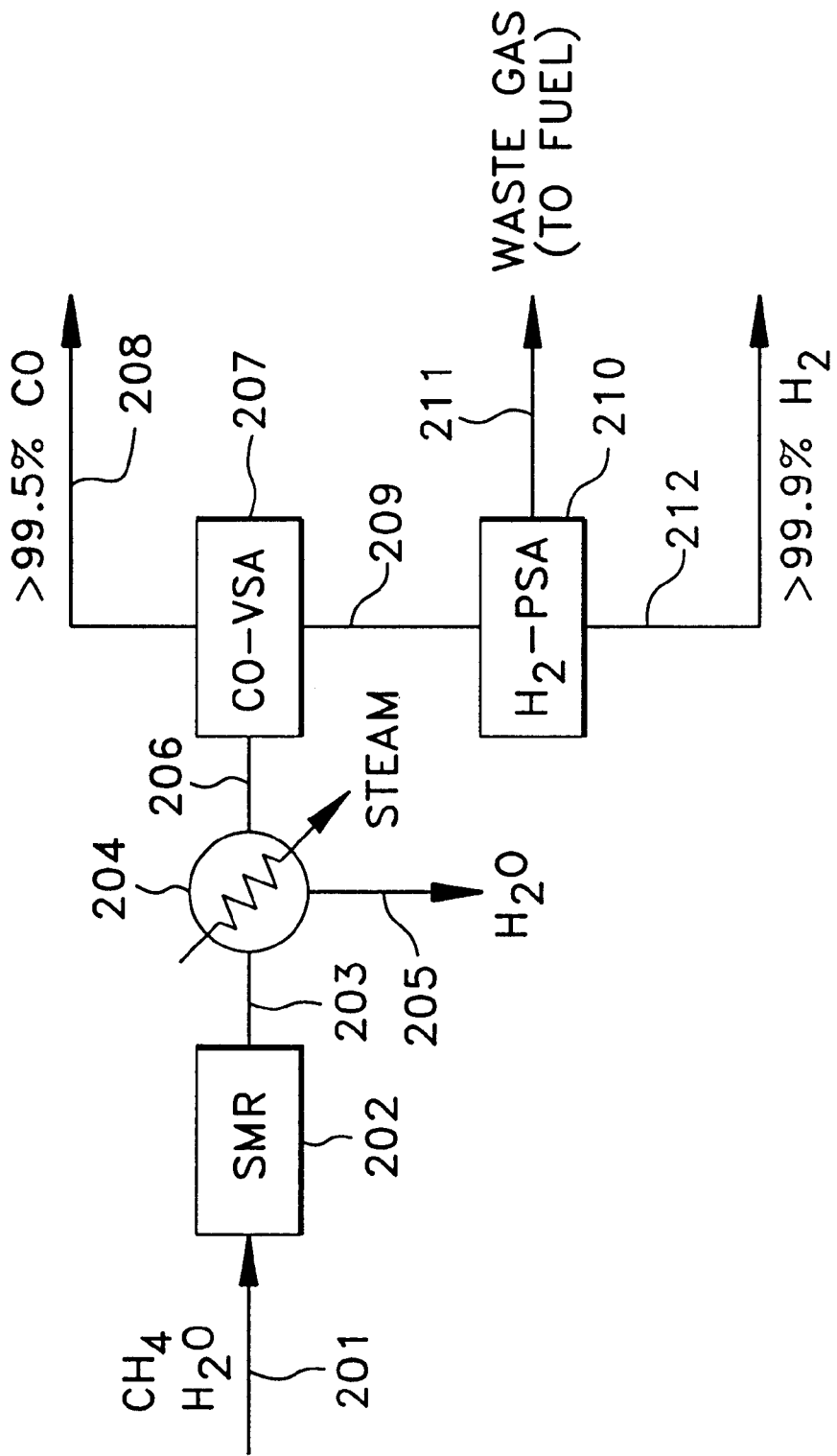
FIG. 8 illustrates a prior art SMR process for producing CO and hydrogen wherein reformate from the steam methane reformer is separated in an integrated CO-VSA unit and a hydrogen PSA unit to form a CO product stream, a hydrogen product stream and a waste gas stream.

Production of CO Product from a Waste Gas Stream of a Conventional CO Production Process via the CO-SER Process Table 2 contains mass balance data for process schemes for producing carbon monoxide as depicted in FIGS. 8 and 9. The table gives the total moles of hydrogen and carbon monoxide produced as product.

TABLE 2*

COMPARATIVE PERFORMANCE OF INTEGRATED SERP-SMR PROCESS FOR THE SIMULTANEOUS PRODUCTION OF CO AND $H_2$

|  |  | Net Quantity of $H_2$ Product (moles/min) | Net Quantity of CO Product (moles/min) |
|---|---|---|---|
| FIG. 8: | SMR + CO – VSA + H2 – PSA | 57.7 | 10.3 |
| FIG. 9: | SMR + CO – VSA + H2 – PSA + SERP (treating 75% of the H2-PSA waste gas) | 59.4 | 16.1 |

*Feed to SMR: 25 moles/min $CH_4$ + 75 moles/min H2O (base case)

Data for the base case system consisting of a steam methane reformer followed by separation of carbon monoxide by a CO-VSA unit and separation of $H_2$ by a H2-PSA unit (FIG. 8) indicates that 57.7 moles/min of hydrogen and 10.3 moles/min of CO can be produced per 100 moles/min of feed to the reformer. Applicants' process consisting of steam methane reforming, separation of carbon monoxide by a CO-VSA unit, separation of H2 by a H2-PSA unit, splitting the $H_2$-PSA waste gas into a purge stream and a process stream (wherein the process stream represents 75% of the total $H_2$-PSA waste gas stream). reaction by the SER process of $CO_2$ and H2 present in the H2-PSA waste gas stream to CO, and recycle of the CO-enriched stream from the SER process to the CO-VSA unit (an embodiment of claim 1 illustrated in FIG. 9) achieves production of 59.4 moles/min of hydrogen and 16.1 moles/min of CO per 100 moles/min of feed to the reformer. Thus, addition of the SER cycle to the conventional SMR process to treat the H2-PSA waste gas yields an unexpected 56% increase in total CO production over the prior art process at the same feed rate to the SMR. Applicant's process also increases the hydrogen product production rate by approximately 3%.

Having thus described the present invention, what is now deemed appropriate for Letters Patent is set forth in the following Claims.

We claim:

1. A process for producing a carbon monoxide product and a hydrogen product which comprises the steps of:
   (a) reacting a feedstock comprising methane and water in the presence of a steam methane reforming catalyst at a temperature ranging from 700° C. to 1000° C. and a pressure ranging from 2 to 50 atmospheres to form a reformate comprising hydrogen, carbon monoxide, carbon dioxide and unreacted feedstock;
   (b) removing water from the reformate to form a water-depleted reformate and separating the water-depleted reformate into the CO product and a CO-depleted stream;
   (c) separating the CO-depleted stream into the hydrogen product and a hydrogen depleted stream and compressing the hydrogen depleted stream to form a pressurized hydrogen depleted stream;
   (d) introducing the hydrogen-depleted stream into a plurality of reactors operated isothermally in a predetermined timed sequence and according to the following steps which are performed in a cycle within each reactor:
      (1) reacting the pressurized hydrogen depleted stream at a first pressure in a first reactor containing an admixture of a water adsorbent and a water gas shift catalyst under reaction conditions sufficient to convert carbon dioxide and hydrogen to carbon monoxide and to adsorb water onto the adsorbent and to form a CO-enriched stream under a relatively constant flow rate at the first pressure which is recycled into the water-depleted reformate steam of step (b);
      (2) countercurrently depressurizing the first reactor to a second pressure by withdrawing a mixture comprising hydrogen, carbon dioxide, carbon monoxide and water;
      (3) countercurrently purging the first reactor at the second pressure with a weakly adsorbing purge fluid with respect to the adsorbent wherein the weakly adsorbing purge fluid is a fluid other a CO-enriched fluid to desorb water from the adsorbent and withdrawing a mixture comprising weakly adsorbing purge fluid, unreacted feedstock, carbon monoxide and water;
      (4) countercurrently purging the first reactor at the second pressure with a CO-enriched purge fluid which does not comprise hydrogen and carbon dioxide to desorb the weakly adsorbing purge fluid and withdrawing a mixture comprising the weakly adsorbing purge fluid, carbon monoxide and water; and
      (5) countercurrently pressurizing the first reactor from the second pressure to the first pressure with the CO-enriched purge fluid prior to commencing another process cycle within the first reactor.

2. The process of claim 1 further comprising:
   (e) introducing a source of hydrogen or carbon dioxide into the hydrogen-depleted stream of step (c) in order to control the ratio of hydrogen and carbon dioxide present in the first reactor according to step (d)(1).

3. The process of claim 1 further comprising the following step which is conducted between step d(1) and step d(2): countercurrently purging the first reactor at the first pressure with a weakly adsorbing purge fluid and withdrawing a mixture comprising unreacted feedstock, carbon monoxide and water.

4. The process of claim 1 wherein the admixture of the adsorbent and the catalyst comprises from 5% to 95% by weight of the adsorbent and from 95% to 5% by weight of the catalyst.

5. The process of claim 1 step (d) wherein the first pressure ranges from 2 atmospheres to 50 atmospheres and the second pressure ranges from 0.05 to 2 atmospheres.

6. The process of claim 1 wherein the adsorbent recited in step (d) is selected from the group consisting of zeolites, alumina and silica gel and the weakly adsorbing purge fluid is selected from the group consisting of methane, hydrogen, nitrogen and carbon dioxide.

7. The process of claim 1 wherein the feedstock comprises water and methane in a stoichiometric ratio of water to methane ranging from 1.5 to 30.

8. The process of claim 1 wherein the steam-methane reforming catalyst is selected from the group consisting of nickel-alumina, nickel-magnesium alumina and noble metal catalysts.

9. The process of claim 1 wherein the water gas shift catalyst is selected from the group consisting of an iron-chromium high temperature shift catalyst, a copper/zinc oxide low temperature shift catalyst and a copper/zinc oxide medium temperature shift catalyst.

* * * * *